US008477626B2

(12) United States Patent
Hahm et al.

(10) Patent No.: US 8,477,626 B2
(45) Date of Patent: Jul. 2, 2013

(54) PACKET PROCESSING APPARATUS FOR REALIZING WIRE-SPEED, AND METHOD THEREOF

(75) Inventors: Jin-Ho Hahm, Daejon (KR); Hae-Won Jung, Daejon (KR)

(73) Assignee: Electronics and Telecommunications Research Institute (KR)

( * ) Notice: Subject to any disclaimer, the term of this patent is extended or adjusted under 35 U.S.C. 154(b) by 370 days.

(21) Appl. No.: 12/345,618

(22) Filed: Dec. 29, 2008

(65) Prior Publication Data

US 2009/0116504 A1 May 7, 2009

Related U.S. Application Data

(62) Division of application No. 11/297,554, filed on Dec. 7, 2005.

(30) Foreign Application Priority Data

Dec. 8, 2004 (KR) .......................... 10-2004-0103170
Oct. 27, 2005 (KR) .......................... 10-2005-0101668

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |

(52) U.S. Cl.
USPC ...... 370/237; 370/232; 370/236.1; 370/236.2

(58) Field of Classification Search
None
See application file for complete search history.

(56) References Cited

U.S. PATENT DOCUMENTS

| | | | | |
|---|---|---|---|---|
| 4,964,119 A | * | 10/1990 | Endo et al. | 370/237 |
| 5,043,981 A | | 8/1991 | Firoozmand et al. | |
| 6,128,292 A | * | 10/2000 | Kim et al. | 370/356 |
| 6,205,117 B1 | | 3/2001 | Doshi et al. | |
| 6,735,679 B1 | * | 5/2004 | Herbst et al. | 711/167 |
| 6,807,175 B1 | * | 10/2004 | Jennings et al. | 370/390 |
| 7,065,050 B1 | * | 6/2006 | Herbst | 370/235 |
| 7,120,118 B2 | * | 10/2006 | Rajagopal et al. | 370/237 |

(Continued)

FOREIGN PATENT DOCUMENTS

| | | | |
|---|---|---|---|
| KR | 10-2003-0042 | * | 6/2003 |
| KR | 10-2003-0042704 A | | 6/2003 |
| KR | 10-2004-0042668 | | 5/2004 |
| KR | 1020040069881 A | | 8/2004 |
| KR | 10-1998-044114 | | 9/2008 |

*Primary Examiner* — Jae Y Lee (74) *Attorney, Agent, or Firm* — Blakely Sokoloff Taylor & Zafman (57) ABSTRACT

Provided are a packet processing apparatus for realizing a wire-speed, and a method thereof. The packet processing apparatus realizes a wire-speed by making an inputted packet be processed in another packet processing apparatus instead of processing the inputted packet for itself. The packet processing apparatus for realizing a wire-speed by having an inputted packet processed in a packet processor of another packet processing apparatus by making an inputted packet detour a packet processor into a detour path, includes: a packet classifier for classifying and storing the inputted packet in a multi-queue based on a priority; a queue manager for including the multi-queue, determining a detour packet among packets stored in the multi-queue and marking the packet as a detour packet; and a packet scheduler for transmitting the packet designated as the detour packet to the detour path. The apparatus is used for a packet communication system.

11 Claims, 9 Drawing Sheets

U.S. PATENT DOCUMENTS

| | | | |
|---|---|---|---|
| 7,200,116 B2 | 4/2007 | Kobayashi | 370/237 |
| 7,346,068 B1* | 3/2008 | Dan et al. | 370/413 |
| 2003/0076840 A1* | 4/2003 | Rajagopal et al. | 370/395.21 |
| 2004/0095885 A1 | 5/2004 | Yang | 370/235.1 |
| 2005/0213506 A1* | 9/2005 | Wakumoto et al. | 370/237 |
| 2009/0116504 A1* | 5/2009 | Hahm et al. | 370/412 |

* cited by examiner

PACKET PROCESSING APPARATUS FOR REALIZING WIRE-SPEED, AND METHOD THEREOF

The present patent application is a Divisional of non-provisional application Ser. No. 11/297,554, filed Dec. 7, 2005.

FIELD OF THE INVENTION

The present invention relates to a packet processing apparatus for realizing a wire-speed, and a method thereof; and, more particularly, to a packet processing apparatus for performing a packet process by using not only resources within the corresponding packet processing apparatus, which used to be used in a conventional technology but also resources of another available packet processing apparatus in a packet communication system.

DESCRIPTION OF RELATED ART

A transmitting system and a receiving system of a packet communication system include a plurality of line cards and more than one port is arranged in each line card. Herein, a port of the transmitting system and a port of the receiving system are connected and the transmitting system transmits a packet to a receiving port of the receiving system at a predetermined maximum speed through a transmitting port whenever a packet to be transmitted is generated. The speed is called a wire-speed, which is a physically possible maximum transmission speed of a link. For example, 2.5 Gbps in Packet over SONET (POS) OC48 communication port and 1 Gbps in a gigabit Ethernet communication port correspond to the wire-speed.

When the receiving system can receive and process all packets transmitted from the transmitting system at the maximum speed, it is approved that the packet communication system has a process performance of a wire-speed with respect to the packet. Although the receiving system should process all packet transmitted to the wire-speed, there is a case that some packets cannot be processed. This is because the line card of the receiving system may not process all packets can be generated.

To have a look at the process of the receiving system, the packet entering through the receiving port stays for a while in a queue before the process. When the first entering packet is processed in a packet processing block in the inside of the line card, the packet staying in the queue is transmitted to the packet processing block in sequence and processed. Therefore, when a speed for filling the packet in the queue is slower than a speed for processing the packet in the packet processing block, the queue is gradually filled with the packet and the packets entering the queue after the queue is filled with the packet are destroyed since there is no room for the packets to be kept. That is, there is a problem that a case that the packet is not processed in the wire-speed.

Also, the line card can receive diverse packets, and a process and required time of the received packet are different from each other. Generally, it takes a long time to process a complicated packet and a comparatively short time to process a simple packet. When the line card is designed, the process performance of the line card is determined in consideration of probability distribution. Herein, when a high-speed processor is selected, a possibility to process the packet without any loss is raised. However, selecting the high-performance processor to reduce the packet loss has a problem that the cost is high.

Also, much of the packet process is performed by making use of hardware. However, some packet process functions can be processed by using software since processing all parts of an option header of the packet by the hardware method does not bring any profit by making a hardware logic complicate and raising a cost. Accordingly, delay can be caused in a process of a specific packet. When the delay occurs frequently, the delays of the packet process are accumulated and the queue is filled with the packets, and eventually this causes the packet loss.

SUMMARY OF THE INVENTION

It is, therefore, an object of the present invention to provide a packet processing apparatus for realizing a wire-speed by making an inputted packet be processed in another packet processing apparatus instead of processing the inputted packet, and a method thereof.

It is another object of the present invention to provide a packet processing apparatus for realizing wire-speed of the packet communication system by processing both packets, which are processed in the other packet processing apparatus and transmitted, and packets, which are not processed in the other packet processing apparatus and transmitted.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

In accordance with an aspect of the present invention, there is provided a packet processing apparatus for realizing a wire-speed by making an inputted packet detour a packet processor into a detour path and processing the inputted packet in a packet processing means of another packet processing apparatus, which is a second packet processing apparatus, including: a packet classifier for classifying and storing the inputted packet in a multi-queue based on a priority; a queue manager for including the multi-queue, determining a detour packet among packets stored in the multi-queue and marking the packet as the detour packet; and a packet scheduler for transmitting the packet designated as the detour packet to the detour path.

In accordance with another aspect of the present invention, there is provided a packet processing apparatus for processing a packet transmitted from another packet processing apparatus, which is a second packet processing apparatus, including: a packet selector for checking whether an inputted packet is a normal packet transmitted after being processed in the second packet processing apparatus or a detour packet transmitted without being processed, and directing the packets into corresponding paths; a queue for storing the detour packet transmitted from the packet selector; a packet scheduler for reading the detour packet stored in the queue and transmitting the detour packet to the packet processing means in the rear end of the packet processing apparatus; and a packet processor for processing the detour packet transmitted from the packet scheduler and outputting the detour packet as the normal packet.

In accordance with another aspect of the present invention, there is provided a packet process method for realizing a wire-speed by making an inputted packet detour a packet processor into a detour path and processing the inputted packet in a packet processor of another packet processing apparatus, which is a second packet processing apparatus, including: a) classifying and storing the inputted packet in a multi-queue based on a priority; b) determining a packet to be detoured among packets stored in the multi-queue and marking the packet as a detour packet; and c) reading the packet determined as the detour packet out of the multi-queue and transmitting the detour packet to the second packet processing apparatus through the detour path.

In accordance with another aspect of the present invention, there is provided a packet process method for processing a packet transmitted from another packet processing apparatus, which is a second packet processing apparatus, including: a) checking whether an inputted packet is a normal packet transmitted after being processed in the second packet processing apparatus or a detour packet transmitted without being processed, and directing the packets for each path; and b) processing the directed detour packets and outputting the detour packets as normal packets.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and advantages of the present invention will become apparent from the following description of the embodiments with reference to the accompanying drawings. Therefore, those skilled in the art that the present invention is included can embody the technological concept and scope of the invention easily. In addition, if it is considered that detailed description on the prior art may blur the points of the present invention, the detailed description will not be provided herein. The preferred embodiments of the present invention will be described in detail hereinafter with reference to the attached drawings.

Although the present invention is applied to a packet communication system such as an Internet Protocol (IP) router, an Ethernet switch and a multi-protocol label switching (MPLS) switch, a process in the IP router will be described as an example for the sake of convenience in explanation. However, it is apparent to those skilled in the art that the present invention is not limited to the IP router.

Also, the packet communication system, to which the present invention is applied, includes a plurality of line cards, a switch card, a processor card for control, and a back plane bus for integrating the cards.

Figure 1:
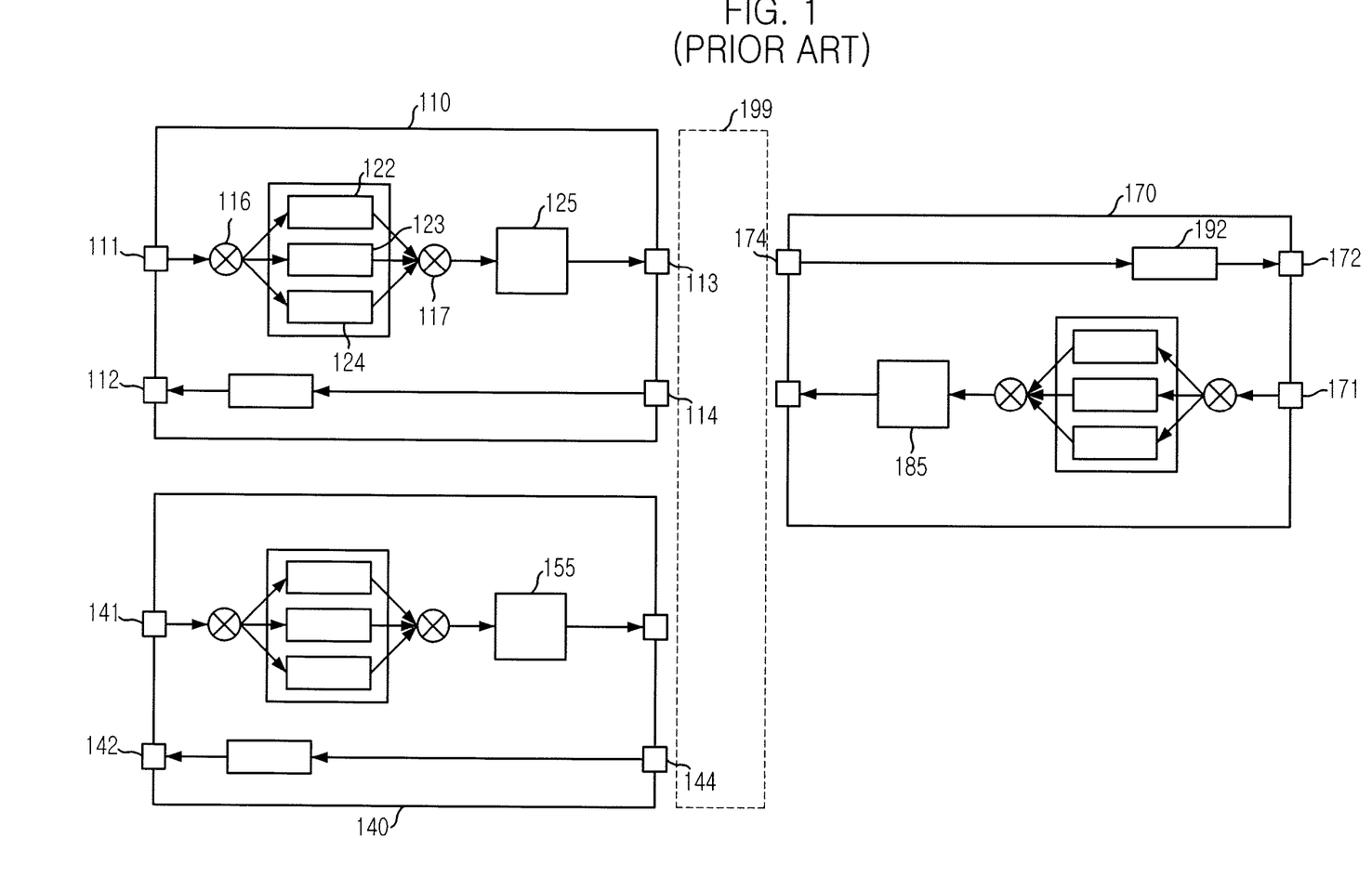
FIG. 1 is a diagram showing a packet process of a general line card.

FIG. 1 is a diagram showing a packet process of a general line card. A procedure that the packet is inputted through an input port 111 of a line card 110, passes through a series of packet processes and is outputted to an output port of the other line card through a switch will be described with reference FIG. 1.

Specifically, the packets, which enter the input port 111, are classified by a packet classifier 116 and stored in corresponding queues 122, 123 and 124. Packets to be assigned to each queue can be classified based on diverse classification standards. One of the most general methods for the classification is based on a priority expressed in a header of each packet.

Diverse methods for designating the priority of the packet are defined in the packet communication system. In case of an Ethernet, the priority of an Ethernet frame can be designated by using 3 bits with a name of Class of Service (COS) in the frame header to support quality of service (QoS) in 802.1Q and a P standard. Also, in case of MPLS, the priority can be designated by allotting 3 bits with the name of Class of Service (COS). Also, in case of IP packet, the priority of the packet can be designated by using 3 bits with the name of Type of Service (TOS) in the packet header, and in case of DiffServ, the priority of the packet can be designated by designating a Type of Service (TOS) field of 6 bits.

The packet classifier 116 stores the packet in each of the queues 122, 123 and 124 with reference to a bit expressing the priority of the packet. The packets are filled in an order that the queues 122, 123 and 124 enter. The packets stored in the queues 122, 123 and 124 are read based on a proper order by a packet scheduler 117 and transmitted to a packet processor 125. The packet processor 125 should prepare for accepting a new packet in order to transmit the packets of the queues 122, 123 and 124 to a packet processor 135.

The packet arriving at the packet processor 125 passes through a lookup procedure of a forwarding table with respect to an IP address and it is determined which port of which line card the packet is outputted to. That is, a specific output port 172 is determined among the ports 112, 142 and 172. A header for a switching process is added to perform packet switching in a switch 199. The packet, which the header is added to, passes through a switch output port 113 and is transmitted to corresponding switch input ports 114, 144 and 174 of the line cards 110, 140 and 170.

When it is determined that the packet is outputted to the output port 172 of the line card 170, the packet is outputted to an external through the output port 172 of the line card after passing through the switch input port 174 and waiting in an output queue 192 for a while. The packet process in the packet processor 125 includes a packet process based on a definition in Access Control List, a packet metering, a process with respect to an MPLS header and diverse processes with respect to the packet for supporting the QoS as well as the lookup of the forwarding table with respect to the packet IP address.

The packet process requiring time in the packet processor 125 is based on a kind of the packet and comparatively long time is generally required for a complicated process. When the packet process is delayed for a long time in the packet processor 125, the queues 122, 123 and 124 are filled with the packets. The packets entering the queue after the queues are completely filled with the packets are discarded since there is no room for storing the packet. Generally, although a poor condition that the packets requiring a complicate process are continuously inputted is considered when a process capacity of the packet processor 125 is designed, there is a possibility that the capacity is not enough for the packets.

In the above case, although there is a room for processing the packet in packet processors 155 and 185 existing in the other line cards 140 and 170, it is not helpful. The object of the present invention is to raise the packet process efficiency by processing the packet, which enters through the input port 111, through the packet processors 155 and 185 in the other line cards 140 and 170 as well as sources in the its own line card 110, thereby processing the packets entering through each of input ports 111, 141 and 171 at the wire-speed without loss.

Figure 2A:
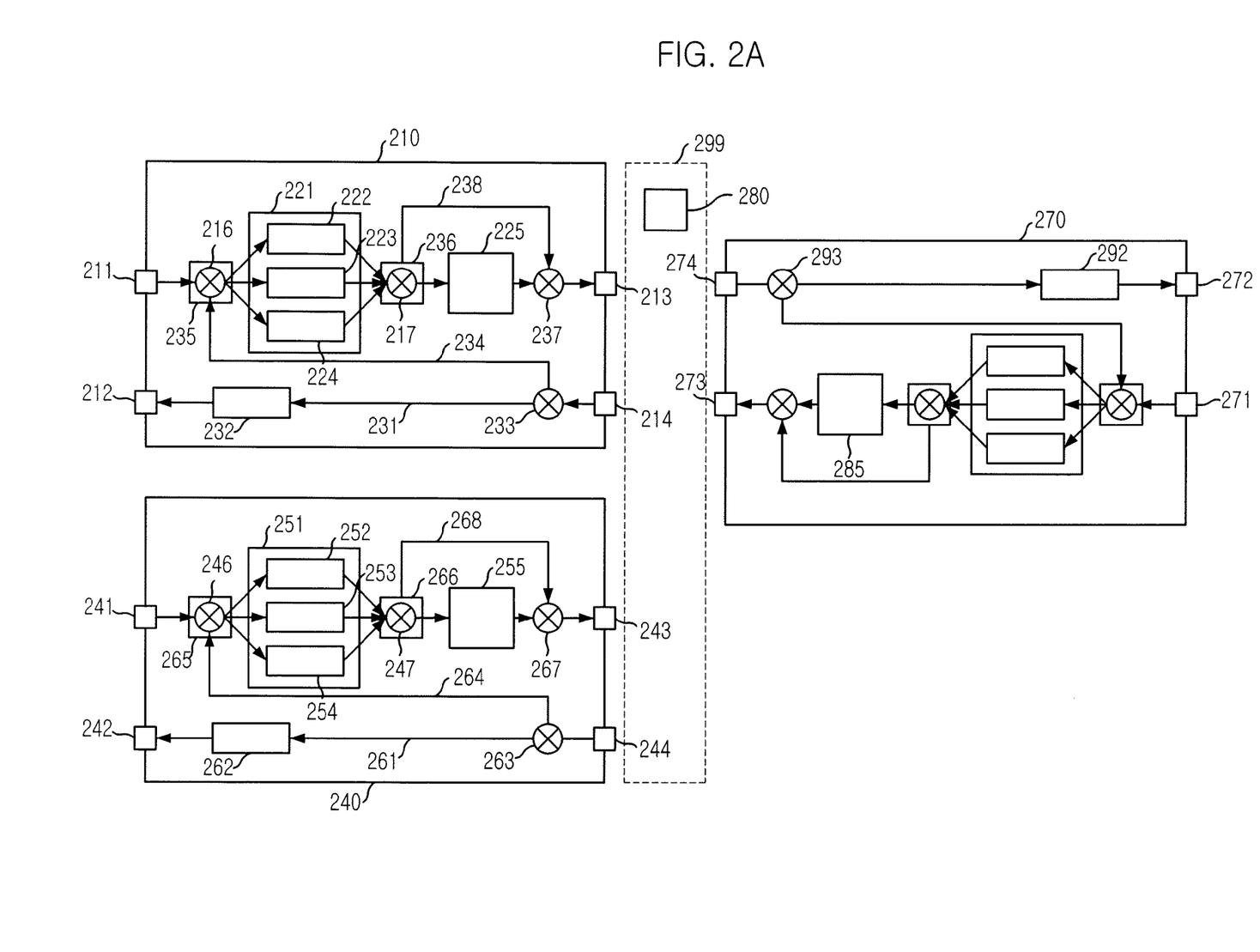
FIG. 2A is a diagram showing a packet process of a line card having a detour packet process function in accordance with an embodiment of the present invention.

FIG. 2A is a diagram showing a packet process of a line card having a detour packet process function in accordance with an embodiment of the present invention. The packet process of the normal packet and the detour packet will be described in detail with reference to FIG. 2A. Herein, the normal packet is processed in the packet processor of the inputted line card and the detour packet is processed after being transmitted to the packet processor of the other line card since burden is too heavy in the packet processor of the line card. A status that the normal packet and the detour packet are inputted in an input port 211 of the line card 210 and outputted to an output port 272 of a line card 270 will be described in detail hereinafter.

Figure 2B:
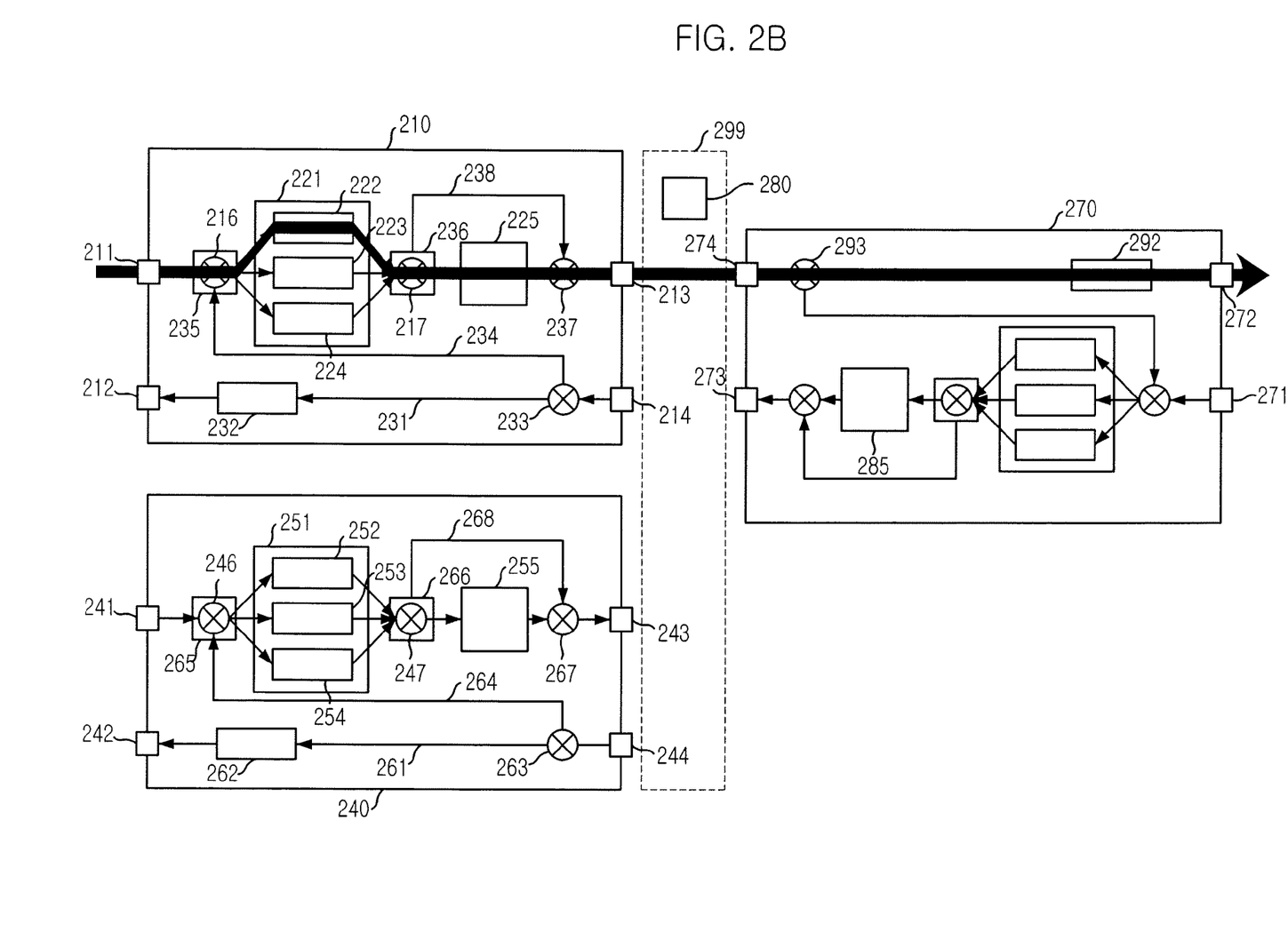
FIG. 2B is a diagram showing a path of a normal packet in a line card having a detour packet process function in accordance with the embodiment of the present invention.

The path of the normal packet is as follows. The packet entering the input port 211 passes through a packet classifier 216, is stored in each of queues 222 and 223, read one by one by a packet scheduler 217 and transmitted to a packet processor 225. The packet processed in the packet processor 225 passes through a detour packet scrambler 237, is outputted to a switch 299 through a switch end output port 213 and transmitted to a switch end input port 274 of the line card 270 in the switch 299. Subsequently, the normal packet passes through an output queue 292 and is outputted to the output port 272. FIG. 2B is a diagram showing a path of a normal packet in a line card having a detour packet process function in accordance with the embodiment of the present invention. A path and a process of the normal packet is the same as the packet process in the conventional line card described in FIG. 1.

Figure 3:
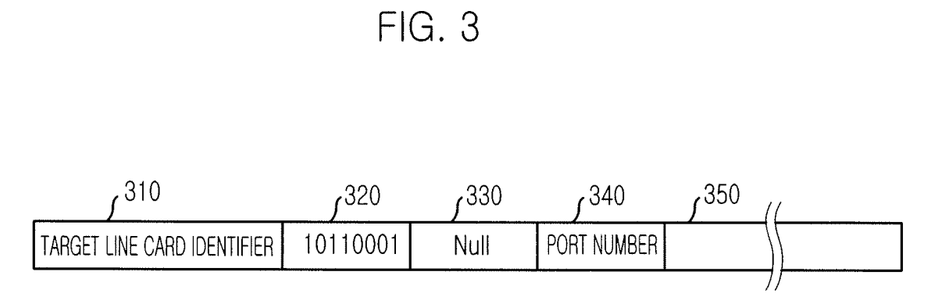
FIG. 3 is a diagram showing a format of a normal packet passing through the packet processor 225.

FIG. 3 is a diagram showing a format of a normal packet passing through the packet processor 225, and the format of FIG. 3 is formed by determining which port of which line card the normal packet is outputted to while the normal packet passes through a packet process in the packet processor 225.

A field of a reference number 310 of FIG. 3 includes a 1-byte target line card identifier. Herein, the target line card identifier notifies which line card the normal packet is transmitted to when the normal packet passes through the switch 299. A field of the reference number 320 includes 1-byte Opcode showing that the packet is a normal packet and a field of a reference number 330 includes 1-byte null data. The null data designate data embedded to meet a form with the format of the normal packet and the detour packet, which will be described hereinafter, but do not have a specific meaning.

Meanwhile, a field of a reference number 340 includes 1-byte port number data showing which port of which line card the packet is outputted, and a field of a reference number 350 includes an IP packet to be outputted to a final output port.

The target line card identifier 310 is removed while the normal packet formed of the format of FIG. 3 passes through the switch 299, and the Opcode 320 and the port number data 340 are removed while the normal packet passes through a rear end packet classifier 293. Finally, only the IP packet 350 is stored in the output queue 292.

Figure 2C:
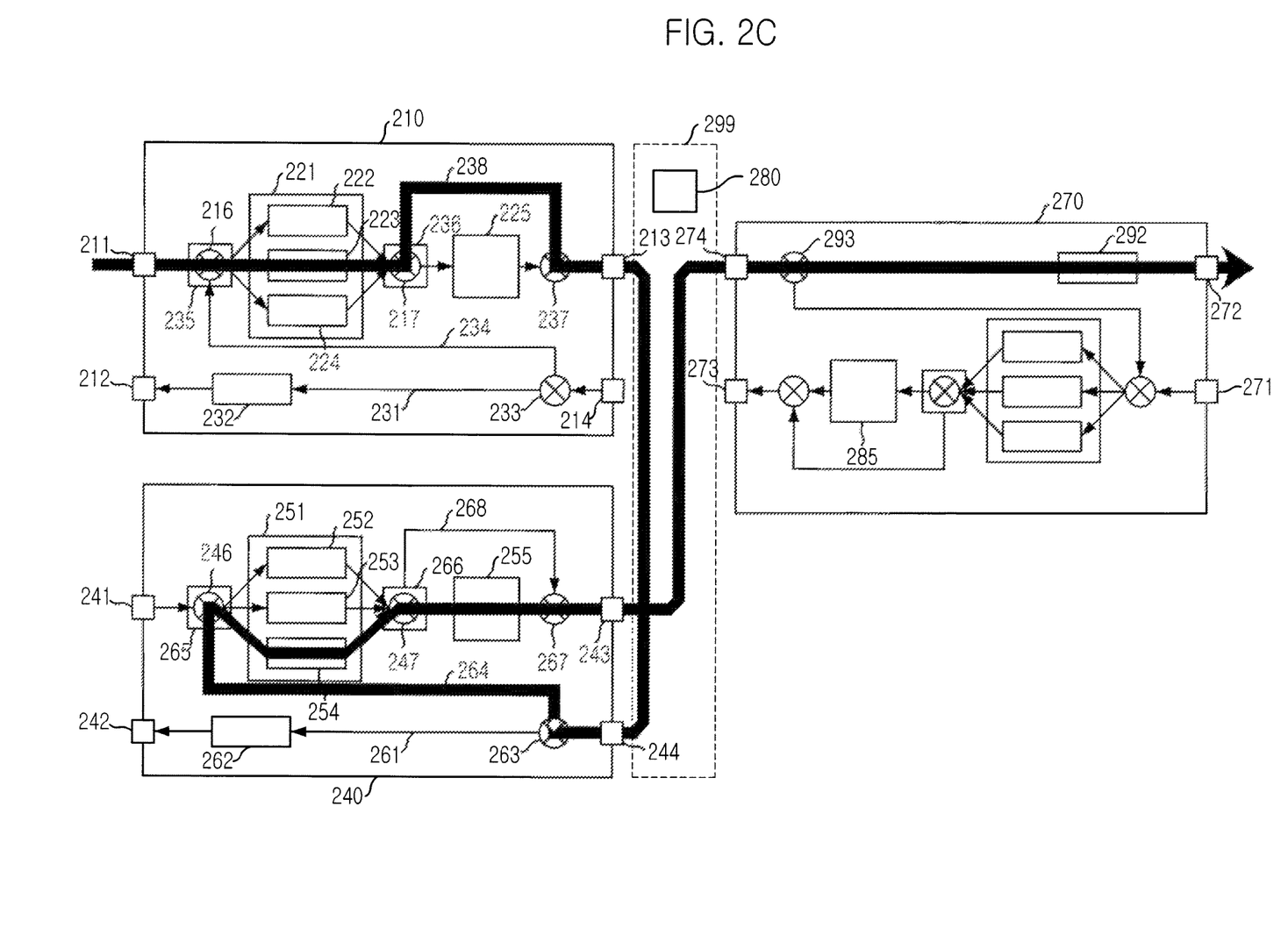
FIG. 2c is a diagram showing a path of a detour packet in the line card having a detour packet process function in accordance with the embodiment of the present invention.

A path of the detour packet is as follows. The packets entering the input port 211 are stored in queues 222 and 223 through the packet classifier 216, and it is determined that some of packets staying in the queue are detour packets. The determined detour packet is inputted to a front end detour path 238 through the packet scheduler 217 and the detour packet is inputted to the switch 299 through the switch end output port 213 after passing through the front end detour packet scrambler 237. The detour packet inputted to the switch 299 is transmitted to a switch end input port 244 of the line card 240 after a switching process, selected in the rear end packet classifier 263 and inputted to a rear end detour path 264. Subsequently, the detour packet is classified by a packet classifier 246 through a rear end detour packet scrambler 265, stored in a queue 254, read one by one by a packet scheduler 247 and transmitted to a packet processor 255. The detour packet processed in the packet processor 255 passes through a front end detour packet scrambler 267, is outputted to the switch 299 through a switch end output port 243 and transmitted to the switch end input port 274 of the line card 270 in the switch 299. Subsequently, the detour packet is identified as an output packet by the rear end packet classifier 293 and outputted to the output port 272 through the output queue 292. FIG. 2C is a diagram showing a path of a detour packet in the line card having a detour packet process function in accordance with the embodiment of the present invention.

The process of the detour packet will be described in detail hereinafter. The detour packet enters through the input port 211 and is stored in one of the multi-queues 222 and 223 through a classification procedure of the packet in the packet classifier 216. Herein, the detour packet is selected among packets in the queues 222 and 223 storing packets of a low priority. In the present embodiment, the packet of the high priority is stored in the queues 222 and the packet of the low priority is stored in the queues 223. The queue 224 is used to store the packet entering after being detoured.

When the detour packet is selected, it is preferred to select the packet of the low priority to minimize a negative effect such as packet delivery delay, which can be generated by the detour process of the packet. When the packet detour is generated, delay of the packet increases since the packet should go through one more line card. Therefore, it is preferred to detour the packet of the low priority supporting a low-quality service instead of the packet of a high priority supporting a high-quality service. However, the present invention is not limited to the above process.

Meanwhile, there is a well-known method for actively dividing a memory space of a regular size and allotting to each queue as one method to realize the multi-queue. The memory space is divided into an area allotted to the queue and an area not allotted to the queue. The non-allotted area of the memory is actively allotted based on necessity of each queue. When the number of packets entering a queue is larger than the number of the packets getting out of the queue, the queue needs more space to receive a new packet and a predetermined space of the non-allotted area are used to make the queue larger. When vacant space of the queue increases since the number of the packet filling a queue is larger than the number of the processed packets, remaining vacant space is returned to the non-allotted area of an entire sharing memory and the returned non-allotted area is used again for a vacant space of another queue.

The queue manager 221 continuously checks a possibility that the queue can be filled with the inputted packets and actively assigns the memory space to each queue as described above. A simple method for predicting saturation of the queue space is to catch a status that the non-assigned area of the memory decreases less than a certain limit. A more complicated method for the prediction is to determine how long it takes to saturate a queue by analyzing the remaining quantity and a decreasing rate of the non-assigned area.

When the saturation of the queue is expected in the above procedure, the queue manager 221 supports that some packets stored in the queues 223 are quickly transmitted to the other line card through the front end detour path 238 without passing through the packet processor 225.

Also, the queue manager 221 determines a series of P numbers of packets as packets to be detoured among the packets stored in the queues 223. A P value can be optimized by an experiential method in a procedure operating a system and can be applied as a variable value. When the P is set up as a small value, a few numbers of packets should be detoured many times, and when the P value is large, many numbers of packets can be detoured a few times. A fact that a total number of the detour packet is P is recorded in a detour packet counter. The value of the detour packet counter decreases by 1 whenever the detour packet is processed one by one. The detour packet counter is recorded by the queue manager 221 and means a sharing data area, which can be read in the front end detour packet processor, i.e., a packet scheduler.

The queue manager 221 marks on the P packets to perform the detour process. That is, "detour packet" is marked on the packets. The metadata are used to mark the detour packets.

Figure 4:
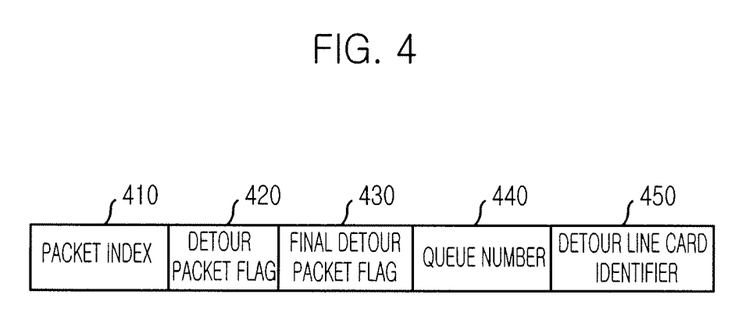
FIG. 4 is a diagram showing a format of metadata for marking a detour packet in accordance with the embodiment of the present invention.

FIG. 4 is a diagram showing a format of metadata for marking a detour packet in accordance with the embodiment of the present invention, and a field of a reference number 410 of FIG. 4 includes a 4-byte packet index formed. The packet index is a pointer pointing a real packet position and can index to a $2^{32}$ address area. A field of a reference number 420 includes a detour packet flag showing whether the packet is the detour packet, e.g., 0:normal and 1:detour, and a field of a reference number 430 includes a final detour packet flag showing whether the packet is a final packet among the P packets. The final detour packet flag is set up as 1 with respect to only a $p^{th}$ detour packet and 0 with respect to a $(P-1)^{th}$ detour packet. A field of a reference number 440 includes a 6-bit queue number showing which queue the detour packet comes from and a field of a reference number 450 includes a detour line card identifier showing a packet processor of which line card is borrowed to process the detour packet.

Also, the queue manager 221 determines which line card the detour packet is sent to when the packet is processed. It is preferred to process the detour packet of each line card after transmitting the detour packet to a line card, whose using rate is the lowest, in order to decentralize load maximally. Information on load of a packet processor of which line card is the smallest can be acquired by reading data of a packet processor using rate storage 280. Registering the using rate of the packet processor of each line card in the packet processor using rate storage 280 is registered by the packet scheduler 217 and will be described hereinafter.

The packet processor using rate information that the queue manager 221 should know is stored in a sharing memory area in the inside of the switch card 299. It is preferred to store the packet processor using rate information in the sharing memory area since a queue manager in each line card is accessible without a bottleneck effect. The other area, which the packet processor using rate information can be stored in, is a memory in the inside of a main processor board. Although the memory of the main processor board is easily accessible, the memory is not a preferred storing position in consideration of effective using of resources since there is generally a limit to a link speed. However, storing the packet processor using rate information in the main processor board is not excluded.

When the packet processor using rate information is updated with newest data, the position of the packet processor used at a smallest quantity can be acquired. The queue manager 221 can request the packet processor using rate storage 280 for the newest packet processor using rate information. A format of the packet requesting the packet processor using rate information to the packet processor using rate storage 280 will be described with reference to FIG. 5.

Figure 5:
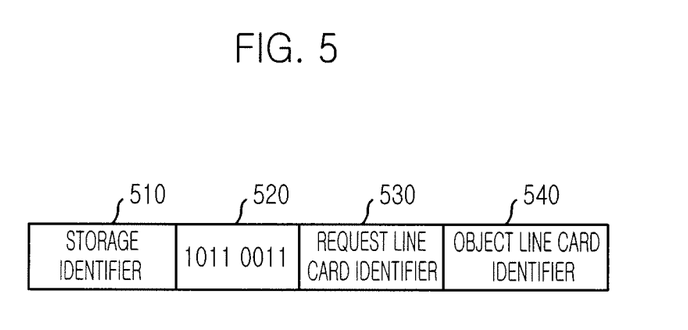
FIG. 5 is a diagram showing a format of a packet requesting packet processor using rate information in accordance with the embodiment of the present invention.

FIG. 5 is a diagram showing a format of a packet requesting packet processor using rate information in accordance with the embodiment of the present invention. A field of a reference number 510 of FIG. 5 includes a 1-byte storage identifier notifying that the packet should be delivered to the packet processor using rate storage 280. Herein, the stored value is 0. A field of a reference number 520 includes 1-byte Opcode showing that the packet requests the packet processor using rate information. A field of a reference number 530 includes the 1-byte request line card identifier showing which line card requests the packet processor using rate information, and a field of a reference number 540 includes the 1-byte object line card identifier showing which line card the packet processor using rate information is for.

Figure 6:
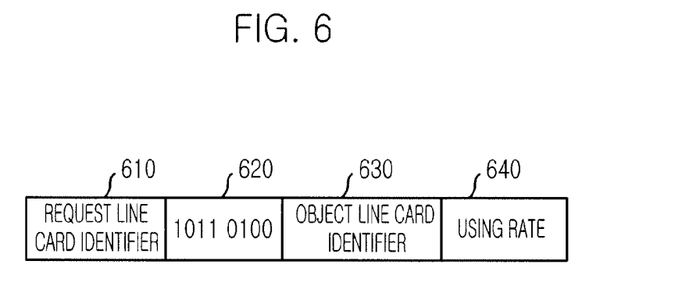
FIG. 6 is a diagram showing a format of a packet providing packet processor using rate information in accordance with the embodiment of the present invention.

When the packet processor using rate storage 280 receives a packet processor using rate information request packet having the format of FIG. 5 from the queue manager 221, the packet processor using rate storage 280 notifies a packet process rate of the line card by delivering a packet processor using rate information providing packet, which has a format of FIG. 6, to the queue manager 221 through the rear end detour path 234.

FIG. 6 is a diagram showing a format of a packet providing packet processor using rate information in accordance with the embodiment of the present invention. A reference number 610 includes the 1-byte request line card identifier showing the line card to receive the using rate information, and a reference number 620 includes the 1-byte Opcode showing that the packet provides the using rate information of the packet processor. Also, a reference number 630 includes the 1-byte object line card identifier showing on which line card the packet processor using rate information is, and a reference number 640 includes using rate data of a 1-byte packet processor expressed as a percentage.

The queue manager 221 grasps recent using rate information by periodically requesting information on a packet processor using rate of each line card to the packet processor using rate storage 280. A next procedure will be described on the assumption that it is confirmed that there is a room in the packet processor of the line card 240 through the above procedure.

Subsequently, the packet scheduler 217 reads the packet in the queue, and transmits the packet to the packet processor 225 or the other line card through the front end detour path 238. It is determined where to transmit the packet with reference to metadata having the format of FIG. 4, which is linked to the packet stored in the queue.

The packet scheduler 217 continuously checks a condition of the packet processor 225 and confirms whether there is a packet designated as a detour packet in the queue when the packet processor 225 does not prepare for reading the packet. When there is the packet designated as the detour packet, the packet scheduler 217 reads and transmits the detour packet to the front end detour packet scrambler 237 through the front end detour path 238. Herein, the packet scheduler 217 adds a header to the detour packet as a format of FIG. 7 as described above. When the packet processor 225 prepares for reading the packet, the packet processor 225 reads the packet in a proper queue based on a schedule and transmits the packet to the packet processor 225.

Figure 7:
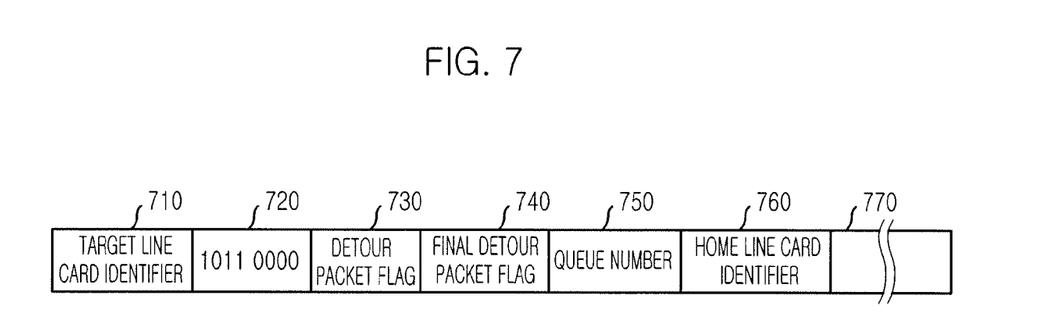
FIG. 7 is a diagram showing a format of a detour packet formed by a packet scheduler 217.

FIG. 7 is a diagram showing a format of a detour packet formed by the packet scheduler 217, and the detour packet formed of the format of FIG. 7 is inputted to the switch 299 through the front end detour path 238.

A field of a reference number 710 of FIG. 7 includes the 1-byte target line card identifier. Herein, the target line card identifier notifies which line card the detour packet should be transmitted to when the detour packet passes through the switch 299. A field of a reference number 720 includes the 1-byte Opcode showing that the packet is the detour packet and a field of a reference number 730 includes a detour packet flag, which is set up to be 1, when the packet is the detour packet, e.g., 0:normal, 1:detour. A field of a reference number 740 includes a final detour packet flag, which is set up to be 1 when the packet is the final detour packet and a field of a reference number 750 includes 6-bit queue number data f showing which queue the detour packet starts from. A field of a reference number 760 includes a 1-byte home line card identifier formed showing information of the line card setting up the inputted packet as the detour packet, and a field of a reference number 770 includes an IP packet entering the packet processor 255.

While the detour packet formed of the format of FIG. 7 passes through the switch 299, the target line card identifier 710 is removed, and while the detour packet passes through the rear end packet classifier 263, the Opcode 720 is removed. While the detour packet passes through the packet scheduler 247, the detour packet flag 730, the final detour packet flag 740, the queue number 750 and the home line card identifier 760 are removed, and only the IP packet 770 is inputted to the packet processor 255. The packet processor 255 forms the IP packet 770 of the detour packet as the format of the normal packet of FIG. 3 and outputs the IP packet 770.

In the above procedure, the packet scheduler 217 reduces a detour packet counter one by one whenever the detour packet is processed one by one. The procedure is performed till all packets come out of the queue. The packets filling the queue rapidly decrease since the packet stored in the queue is transmitted through the packet processor 225 and the detour path 238. Accordingly, a possibility that the queue is saturated decreases and a room for accepting a new packet can be prepared.

While the packet scheduler 217 processes all detour packets, locks the queue and accepts the packet in the queue, the packet scheduler 217 prevents the packet from going out the queue through the packet processor 225 and the detour path 238. Locking the queue is for protecting an output priority of the packet remaining in the detoured packet and the queue. That is, locking the queue is for preventing the packet from going out to an output port in a wrong order.

Also, the packet scheduler 217 measures how much the packet processor 225 is busy to process the packets, and stores the result in the packet processor using rate storage 280. The using rate information should be updated as frequently as a condition of the queue can be reflected. Since the present invention suggests a method for using information of a packet process using frequency instead of a detailed method for calculating a packet process using frequency of a packet processor, a detailed method for determining the packet process using frequency will not be described herein. The packet processor using rate information of each line card is updated in the packet processor using rate storage 280 and queue managers of each line card read the packet processor using rate information of each line card from the packet processor using rate storage 280. The procedure is described hereinbefore.

Figure 8:
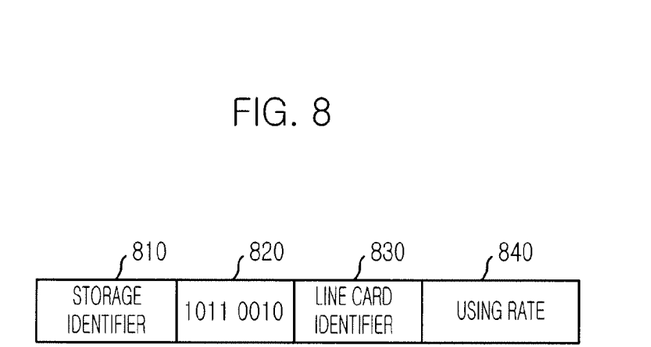
FIG. 8 is a diagram showing a format of a packet used when the packet scheduler registers the packet processor using rate in a packet processor using rate storage in accordance with the embodiment of the present invention.

FIG. 8 is a diagram showing a format of a packet used when a packet scheduler registers a packet processor using rate in a packet processor using rate storage in accordance with the embodiment of the present invention. A field of a reference number 810 includes the 1-byte storage identifier showing that the packet should be transmitted to the packet processor using rate storage 280 through the switch 299 and a field of a reference number 820 includes the 1-byte Opcode showing that the packet records the packet processor using rate. Also, a field of a reference number 830 includes the 1-byte line card identifier showing a using rate value of which line card the field of a reference number 830 designates, and a field of a reference number 840 includes 1-byte percentage data expressing how many percentages of packet processors are used.

Subsequently, the detour packet is moved to the front end detour packet scrambler 237 and the front end detour packet scrambler 237 scrambles a detour packet and a normal packet coming from both ways. That is, the front end detour packet scrambler 237 scrambles the packets by rotationally checking a buffer corresponding to each path. When a speed for rotationally checking the buffer of both ways is faster than a speed for filling each buffer with the packets, the packet can be processed without delay.

The detour packet passing through the front end detour packet scrambler 237 enters the switch 299 through the switch end output port 213. The detour packet entering the switch is switched with the line card 240 by information recorded in the target line card identifier 710 as shown in FIG. 7. The target line card identifier 710 is removed in the procedure and inputted into the switch end input 244 of the line card 240.

The rear end packet classifier 263 classifies a normal packet and a detour packet coming through the switch end input 244 and dividedly transmits the normal packet and the detour packet to each path. While the normal packet having the format of FIG. 3 passes through the switch 299, the target line card identifier 310 is removed and the Opcode 320 showing that the packet is the normal packet is arranged in a front end of the normal packet. While the detour packet having the format of FIG. 7 passes through the switch 299, the target line card identifier 710 is removed and the Opcode 720 showing that the packet is the detour packet is arranged in a front end of the detour packet. The rear end packet classifier 263 determines whether each packet is the normal packet or the detour packet with reference to each of the Opcodes 320 and 720.

The normal packet is a packet that the packet is processed in the packet processor of the other line card. Therefore, only a process to output the normal packet to output port 242 through an output queue 262 remains. The detour packet is transmitted to a rear end detour path 264 by the rear end packet classifier 263. The detour packet is a packet, which is not processed in its own line card 210, but transmitted to the other line card 240. Therefore, the detour packet should be processed in the packet processor 255 of the newly arriving line card 240.

The detour packet arrives at the rear end detour packet scrambler 265 through the rear end detour path 264. Although it is described as the rear end detour packet scrambler 265 functions independently from the packet classifier 246, it is only for the sake of convenience in explanation. The rear end detour packet scrambler 265 and the packet classifier 246 can function and be realized as one module.

The rear end detour packet scrambler 265 scrambles the detour packet arriving through the rear end detour path 264 and the packet coming through an input port 241 of the line card 240 as one path. The scrambled detour packet and normal packet are classified by the packet classifier 246 based on the priority and stored in the queue. A queue 252 stores the packet of a high priority and a queue 253 stores the packet of a low priority. Although the queues are divided into two based on the priority in FIG. 2, there can be more queues divided based on the priority.

The queue 254 stores the detour packet. Therefore, the detour packet enters the rear end detour packet scrambler 265 through the rear end detour path 264 and stored in the queue 254 through the packet classifier 246. A procedure that the packet scheduler 247 transmits the packet of the queue to the packet processor 255 or the front end detour path 268 by reading the packet one by one based on the scheduling is the same as the above description. Herein, the detour packet detoured from the other line card cannot be transmitted to the other line card through the front end detour path 268. Therefore, packets stored in the queue 254 are transmitted to the packet processor 255 by the packet scheduler 247.

A packet process such as an address lookup is performed on the detour packet transmitted to the packet processor 255 and the detour packet is generated as the normal packet of the format of FIG. 3. The packet passing through the packet processor 255 enters the switch 299 through the front end detour packet scrambler 267 and the switch end output port 243. When the packet switched in the switch 299 enters the rear end packet classifier 293 of the line card 270 through the switch end input port 274 and outputted to the output port 272 after staying in the output queue 292 for a while, all procedures of the detour packet process are finished.

In a procedure that the detour packet is transmitted from the packet scheduler 247 to the packet processor 255, a final detour packet checker 266 checks whether the detour packet, which is processed in the present time, is the final detour packet or not. That is, while the detour packet formed of the format of FIG. 7 passes through the switch 299, the target line card identifier 710 is removed. While the detour packet passes through the rear end packet classifier 263, the Opcode 720 is removed. Herein, the final detour packet checker 266 checks whether the detour packet is the final detour packet or not through the detour packet flag 730 and the final detour packet flag 740, and the detour packet flag 730 and the final detour packet flag 740 are removed.

Although it is described as the final detour packet checker 266 functions dependently from the packet scheduler 247, the final detour packet checker 265 and the packet scheduler 246 can function and be realized as one module.

Meanwhile, as described above, the packet scheduler 217 of the line card 210 transmits the final detour packet in a series of detour packets, locks the queue and accepts the packet in the queue. However, the packet scheduler 217 does not transmit the packet. The final detour packet checker 266 releases the locked queues 223.

The final detour packet checker 266 checks the home line card identifier 760 which line card the detour packet comes from and checks the queue number 750 which queue the detour packet comes from. Subsequently, the final detour packet checker 266 removes the home line card identifier 760 and the queue number 750. The final detour packet checker 266 transmits the same queue lock release packet as shown in FIG. 9 to the packet scheduler 217 of the line card 210 after the procedure.

Figure 9:
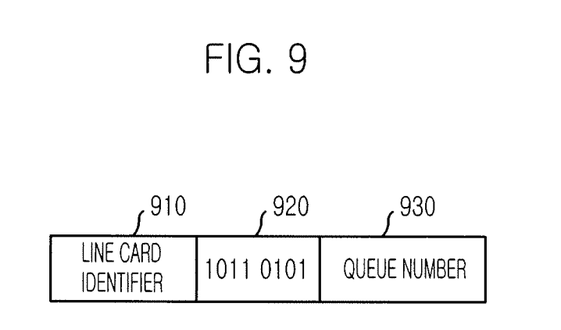
FIG. 9 is a diagram showing a format of a queue lock release packet in accordance with the embodiment of the present invention.

FIG. 9 is a diagram showing a format of a queue lock release packet in accordance with the embodiment of the present invention. A field of a reference number 910 of FIG. 9 includes the 1-byte line card identifier designating the line card, on which the locked queue exists, and a field of a reference number 920 includes the Opcode showing that the packet is the queue lock release packet. A field of a reference number 930 includes a 1-byte or 6-bit queue number designating the locked queue of the line card.

The queue lock release packet having the format of FIG. 9 enters a switch end input port 214 through the front end detour path 268, the front end detour packet scrambler 267, the switch end output port 243 and the switch 299 and arrives at the packet scheduler 217 through a rear end packet classifier 233, the rear end detour path 234, a rear end detour packet scrambler 235, the packet classifier 216 and the queue 224. The queue lock release packet releases the locked queues 223 after the packet scheduler 217 transmits the detour packet and. Subsequently, the queues 223 attend the scheduling object of the packet scheduler 217 and starts transmitting the packet to the packet processor 223.

Figure 10:
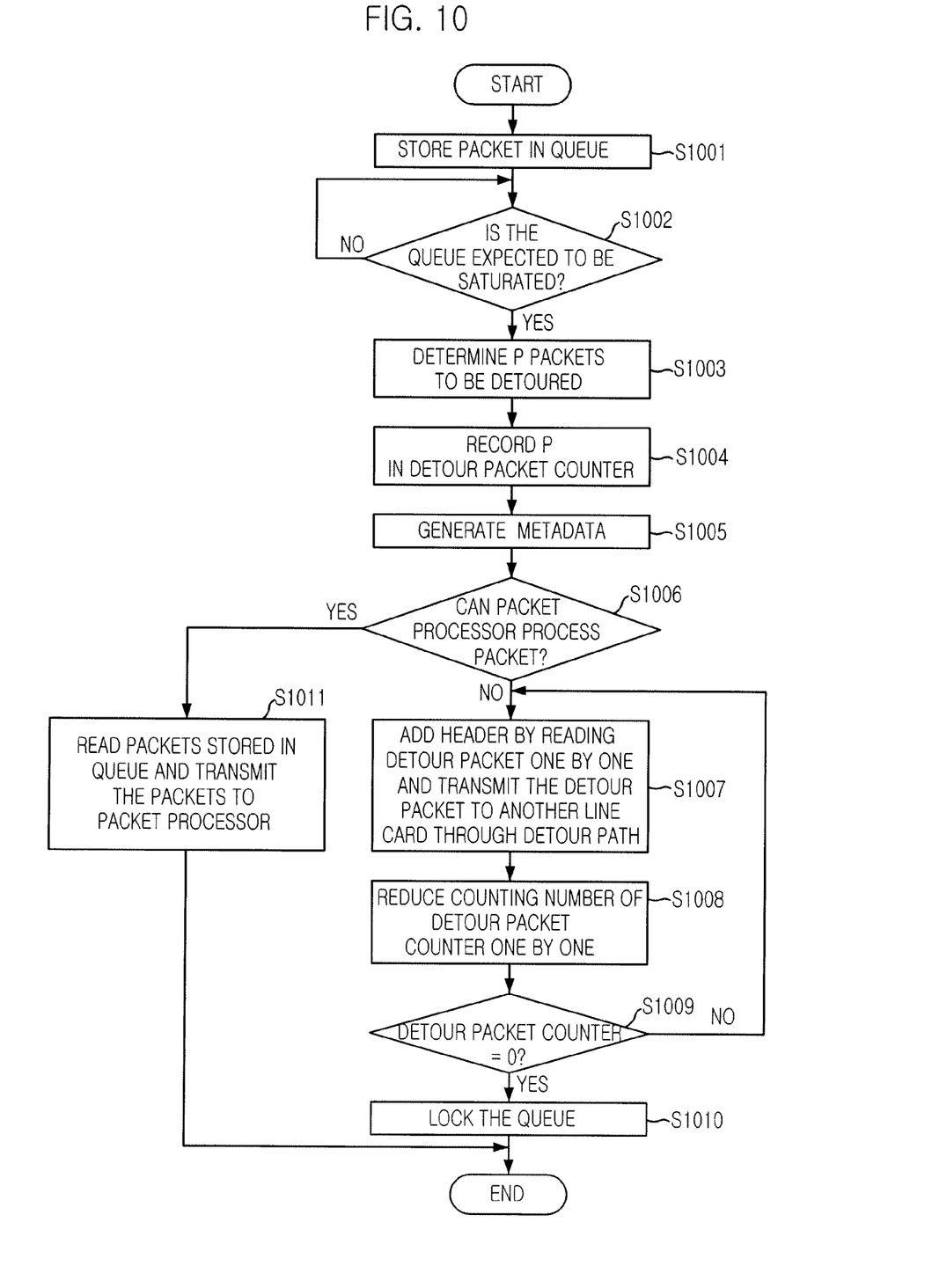
FIG. 10 is a flowchart describing a packet process method for realizing a wire-speed in accordance with an embodiment of the present invention.

FIG. 10 is a flowchart describing a packet process method for realizing a wire-speed in accordance with an embodiment of the present invention.

As shown in FIG. 10, at step S1001, the packet classifier 216 stores an input packet in multi-queues 222 and 223 based on a priority, and at step S1002, the queue manager 221 determines saturation possibilities of the queues 222 and 223 by the inputted packets.

When the queues 222 and 223 are expected to be saturated, the queue manager 221 determines a series of P packets to be detoured among the packets stored in the queues 223 at step S1003, and records the fact that there are P detour packets in the detour packet counter at step S1004.

At step S1005, the queue manager 221 generates the metadata as the format of FIG. 4 with respect to the determined P detour packets.

At step S1006, the packet scheduler 217 continuously checks the condition of the packet processor 225 and determines whether the packet processor 225 prepares for reading the packet.

At step S1011, when the packet processor 225 prepares for reading the packet, the packet scheduler 217 reads the packets stored in the queues 222 and 223 based on a proper order and transmits the packets to the packet processor 225. The packet processor 225 forms the received packet as the format of FIG. 3 and outputs the packet to the destination line card.

At step S1007, when the packet processor 225 does not prepare for reading the packet, the packet scheduler 217 reads the detour packet stored in the queue 223 one by one with reference to the metadata having the format of FIG. 4 and transmits the detour packet to the other line card through the front end detour path 238 by adding a header as the format of FIG. 7.

At step S1008, the packet scheduler 247 reduces the detour packet counter one by one whenever the detour packets are processed one by one. At steps S1009 and S1010, when all detour packets are transmitted to the other line card through the front end detour path 238, the packet scheduler 247 locks the queue 223. Locking the queue 223 is for protecting an output order of the packets which remain in the detoured packet and the queues 223. That is, the queue 223 is locked to prevent the packets from going out to the output port based on a wrong order.

Figure 11:
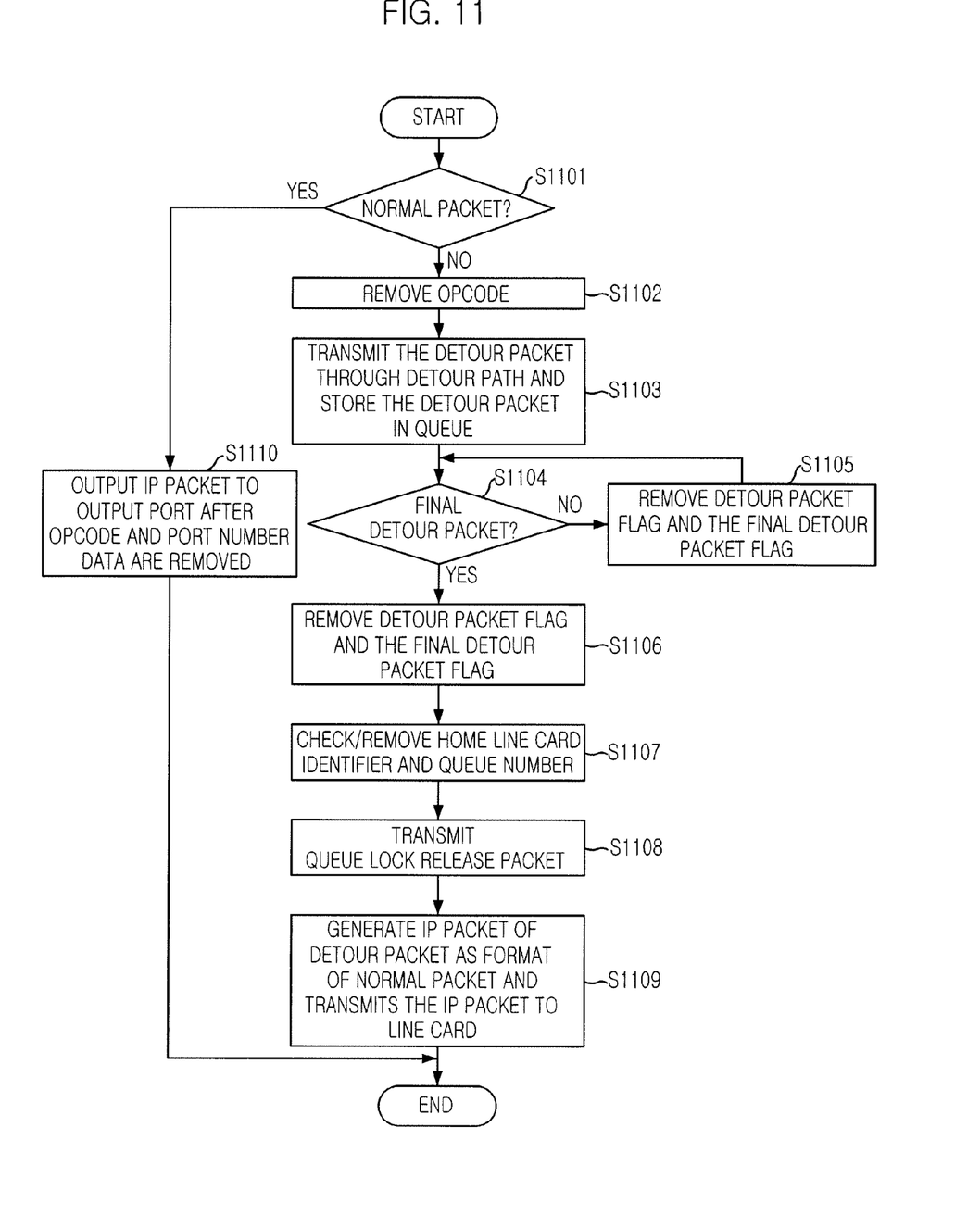
FIG. 11 is a flowchart describing a packet process method for realizing a wire-speed in accordance with another embodiment of the present invention.

FIG. 11 is a flowchart describing a packet process method for realizing a wire-speed in accordance with another embodiment of the present invention. A case that the detour packet, which is transmitted through the detour path without being processed in the line card 210 and 270, and the normal packet, which is transmitted after normally processed in the line cards 210 and 270, is inputted the line card 240 will be described as an example. Herein, it is assumed that a destination output port of the detour packet is the output port 272 and the destination output port of the normal packet is the output port 242.

While the normal packet formed of the format of FIG. 3 in the packet processors 225 and 285 of the line cards 210 and 270 passes through the switch 299, the target line card identifier 310 is removed and the normal packet is inputted. While the detour packet, which is not processed in the line cards 210 and 270 but transmitted through the detour path after being formed of the format of FIG. 5, passes through the switch 299, the target line card identifier 540 is removed and the detour packet is inputted to the rear end packet classifier 263.

As shown in FIG. 11, at step S1101, the rear end packet classifier 263 determines whether each packet is the normal packet or the detour packet with reference to the Opcodes 320 and 720.

At step S1110, while the normal packet passes through the rear end packet classifier 263, the normal packet is transmitted to the output queue 292 after the Opcode 320 and the port number data 340 are removed, and only the IP packet 350 is finally outputted to the output port 242.

Meanwhile, at step S1102, while the detour packet passes through the rear end packet classifier 263, the Opcode 720 is removed. At step S1103, the detour packet, in which the Opcode 720 is removed, enters the rear end detour packet scrambler 265 through the rear end detour path 264 and is stored in the queue 254 through the packet classifier 246. Although it is described as the rear end detour packet scrambler 265 functions independently from the packet classifier 246 for the sake of convenience in explanation, the rear end detour packet scrambler 265 and the packet classifier 246 can function and be realized as one functional module.

The packet scheduler 247 transmits the detour packet stored in the queue 254 to the packet processor 255 after reading the detour packet one by one based on the scheduling. At step S1104, the final detour packet checker 266 checks the detour packet flag 730 and the final detour packet flag 740 whether the detour packet is the final detour packet, and removes the detour packet flag 730 and the final detour packet flag 740 at steps S1105 and S1106. Although it is described as the final detour packet checker 266 functions independently from the packet scheduler 247 for the sake of convenience in explanation, a function of the final detour packet checker 265 is a part of functions of the packet classifier 246.

In case of the final detour packet, the final detour packet checker 266 checks the home line card identifier 760 of the detour packet to know which line card the detour packet comes from and the queue number 750 to know which queue the detour packet comes from, and removes the home line card identifier 760 and the queue number 750 at step S1107.

At step S1108, the final detour packet checker 266 generates and transmits the same queue lock release packet as FIG. 9 to the packet scheduler of the line card, which corresponds to the home line card identifier 760.

At step S1109, the packet processor 255 generates the IP packet of the detour packet as the format of the same normal packet as FIG. 3 and transmits the packet to the line card.

The present invention can improve a performance of each packet processing apparatus by sharing and using packet process resources of the other packet processing apparatus existing in the inside of a communication system instead of selecting a high-performance processor as a method for raising a process rate of the packet in the packet processing apparatus.

Therefore, the substantial packet process performance can be expressed as an addition of packet process resources, of the packet processing apparatus, and packet process resources, which are not used in all packet processing apparatuses mounted in an inside of the communication system.

That is, the present invention is economical since the present invention does not generate an additional cost by borrowing and applying the packet process resources, which are not used in each packet processing apparatus.

As described in detail, the present invention can be embodied as a program and stored in a computer-readable recording medium, such as CD-ROM, RAM, ROM, a floppy disk, a hard disk and a magneto-optical disk. Since the process can be easily implemented by those skilled in the art, further description will not be provided herein.

The present application contains subject matter related to Korean patent application Nos. 2004-0103170 and 2005-0101668, filed with the Korean Intellectual Property Office on Dec. 8, 2004, and Oct. 27, 2005, respectively, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A packet processing apparatus comprising:
    a first packet processing apparatus;
    a second packet processing apparatus for processing a packet transmitted from said first packet processing apparatus, said second packet processing apparatus comprising:
        a packet selecting means (246) for checking whether an inputted packet is a normal packet transmitted after being processed in the second packet processing apparatus or a detour packet transmitted without being processed, and directing the packets into corresponding paths;
        a queue (254) for storing the detour packet transmitted from the packet selecting means;
        a packet scheduling means (247) for reading the detour packet stored in the queue and transmitting the detour packet to a packet processing means (255) in the rear end of the second packet processing apparatus;
        the packet processing means (255) for processing the detour packet transmitted from the packet scheduling means; and
        a detour packet scrambler means (267) for rotationally checking a buffer for each of the corresponding paths and outputting the detour packet as the normal packet;
    wherein the packet scheduling means generates a queue lock release packet based on field information of the detour packet and transmits the queue lock release packet to the first packet processing apparatus which transmits the detour packet.

2. The apparatus as recited in claim 1, wherein the packet selecting means determines whether the inputted packet is the normal packet or the detour packet based on an Opcode.

3. The apparatus as recited in claim 1, wherein the normal packet of the packet selecting means includes:
   a field for providing information showing that the packet is a normal packet;
   a field for providing port number information that the packet us outputted; and
   a field which includes an IP packet to be finally outputted,
   wherein the packet selecting means transmits the IP packet of the normal packet to a queue connected to a port of the port number.

4. A packet processing apparatus comprising:
   a first packet processing apparatus;
   a second packet processing apparatus for processing a packet transmitted from said first packet processing apparatus, said second packet processing apparatus comprising:
      a packet selecting means (246) for checking whether an inputted packet is a normal packet transmitted after being processed in the first packet processing apparatus or a detour packet transmitted without being processed, and directing the packets into corresponding paths;
      a queue (254) for storing the detour packet transmitted from the packet selecting means;
      a packet scheduling means (247) for reading the detour packet stored in the queue and transmitting the detour packet to a packet processing means (255) in the rear end of the second packet processing apparatus;
      the packet processing means (255) for processing the detour packet transmitted from the packet scheduling means and outputting the detour packet as the normal packet,
      wherein the detour packet stored in the queue includes:
         a field for providing information on whether the packet is a detour packet;
         a field for providing information on whether the packet is a final detour packet;
         a field for providing information on which queue the packet comes from; and
         a field for providing information of the first packet processing apparatus which sets up the packet as the detour packet;
      wherein the packet scheduling means generates a queue lock release packet based on field information of the detour packet and transmits the queue lock release packet to the first packet processing apparatus which transmits the detour packet.

5. The apparatus as recited in claim 4, wherein the queue lock release packet includes:
   a field for providing information of the packet processing apparatus that a locked queue exists;
   a field for providing information showing that the packet is the queue lock release packet; and
   a field for providing information of the locked queue.

6. The apparatus as recited in claim 4, wherein the packet scheduling means removes the field of the detour packet and transmits only a pure IP packet to the packet processing means.

7. A packet processing method comprising:
   processing a packet by a first packet processing apparatus as one of a regular packet and a detour packet;
   processing a packet transmitted by said first packet processing apparatus by a second packet processing apparatus;
   said second processing apparatus checking whether an inputted packet is a normal packet transmitted after being processed in the second packet processing apparatus or a detour packet transmitted without being processed, and dividing the packets into each path;
   said second processing apparatus processing the divided detour packets, rotationally checking a buffer corresponding to each said path and outputting the detour packet as the normal packet; and
   generating a queue lock release packet based on field information of the detour packet and transmits the queue lock release packet to the first packet processing apparatus which transmits the detour packet.

8. The method as recited in claim 7, wherein it is determined in the step a) whether the packet is a normal packet or a detour packet based on a Opcode of the packet transmitted from the second packet processing apparatus.

9. The method as recited in claim 7, wherein the normal packet processed in and transmitted from the second packet processing apparatus includes:
   a field for providing information showing that the packet is a normal packet;
   a field for providing port number information that the packet is outputted; and
   a field including an IP packet to be finally outputted.

10. A packet processing method comprising:
    processing a packet by a first packet processing apparatus, as one of a regular packet and a detour packet;
    processing a packet transmitted by said first packet processing apparatus by a second packet processing apparatus;
    said second processing apparatus checking whether an inputted packet is a normal packet transmitted after being processed in the second packet processing apparatus or a detour packet transmitted without being processed, and dividing the packets into each path;
    said second processing apparatus processing the divided detour packets and outputting the detour packet as the normal packet; and
    generating a queue lock release packet based on field information of the detour packet and transmits the queue lock release packet to the first packet processing apparatus which transmits the detour packet,
    wherein the detour packet includes:
       a field for providing information on whether the packet is a detour packet;
       a field for providing information on whether the packet is a final detour packet;
       a field for providing information on which queue the packet comes from; and
       a field for providing information on the packet processing apparatus that sets up the packet as a detour packet.

11. The method as recited in claim 10, wherein the queue lock release packet includes:
    a field for providing information of the packet processing apparatus having a locked queue;
    a field for providing information showing that the packet is a queue lock release packet; and
    a field for providing information of the locked queue.

* * * * *